(12) United States Patent
Peresan et al.

(10) Patent No.: US 9,718,008 B2
(45) Date of Patent: Aug. 1, 2017

(54) APPARATUS, SYSTEM AND METHODS TO DIVIDE FLOW

(71) Applicant: Derrick Corporation, Buffalo, NY (US)

(72) Inventors: Mike Peresan, Strykersville, NY (US); James Colgrove, Holland, NY (US)

(73) Assignee: Derrick Corporation, Buffalo, NY (US)

( * ) Notice: Subject to any disclaimer, the term of this patent is extended or adjusted under 35 U.S.C. 154(b) by 570 days.

(21) Appl. No.: 14/206,617

(22) Filed: Mar. 12, 2014

(65) Prior Publication Data

US 2014/0263103 A1 Sep. 18, 2014

Related U.S. Application Data

(60) Provisional application No. 61/777,391, filed on Mar. 12, 2013.

(51) Int. Cl.
| | |
|---|---|
| *B07B 13/16* | (2006.01) |
| *B01D 33/37* | (2006.01) |
| *B01D 33/03* | (2006.01) |

(52) U.S. Cl.
CPC ......... *B01D 33/37* (2013.01); *B01D 33/0346* (2013.01); *B07B 13/16* (2013.01); *B07B 2201/04* (2013.01); *B07B 2230/01* (2013.01); *Y10T 137/0318* (2015.04); *Y10T 137/85938* (2015.04)

(58) Field of Classification Search
CPC .... B01D 33/0346; B01D 33/37; B07B 13/16; B07B 2201/04; B07B 2230/01; Y10T 137/0318; Y10T 137/85938

USPC ................ 210/780, 359, 388, 456; 209/311, 209/314–317; 137/561 A
See application file for complete search history.

(56) References Cited

U.S. PATENT DOCUMENTS

| | | | | |
|---|---|---|---|---|
| 4,940,535 | A * | 7/1990 | Fisher | B01D 33/03 137/875 |
| 6,820,748 | B2 * | 11/2004 | Fallon | B07B 1/46 209/311 |
| 2011/0005742 | A1 * | 1/2011 | Marshall | E21B 21/01 166/75.12 |
| 2013/0220945 | A1 * | 8/2013 | Carr | B07B 1/04 210/768 |

FOREIGN PATENT DOCUMENTS

WO WO2012037243 A2 3/2012

* cited by examiner

*Primary Examiner* — Frank Lawrence
(74) *Attorney, Agent, or Firm* — Jason P. Mueller; Adams & Reese LLP

(57) ABSTRACT

An example nonlimiting embodiment of the present invention provides a flow divider that includes a slurry receiving compartment and a discharge arrangement having a plurality of discharge apertures. The slurry receiving compartment is arranged to relatively uniformly flow a portion of a slurry into each of the discharge apertures. The discharge apertures may be arranged linearly and/or horizontally such that the portions of the slurry exits each of the discharge apertures at a relatively even flow rate and feed feed boxes connected to vertically tiered screening surfaces of a screening machine.

31 Claims, 6 Drawing Sheets

APPARATUS, SYSTEM AND METHODS TO DIVIDE FLOW

CROSS REFERENCE TO RELATED APPLICATIONS

This application claims the benefit of U.S. Provisional Patent Application No. 61/777,391, which is hereby incorporated by reference herein.

FIELD OF INVENTION

The present disclosure relates generally to flow dividers and methods of dividing flow. In exemplary though non-limiting embodiments, the present disclosure relates to an apparatus for receiving fluid having solid material suspended therein and for discharging fluid to a vibratory screening machine having a plurality of screening units.

BACKGROUND

In a number of industrial applications, liquid suspensions or slurries may be fed to screening equipment to separate out solids of various sizes from the liquid or slurry. Often, it is desired to discharge the slurry at several locations along a vibrating screen or on more than one screen or both. For example, embodiments of the stacked and staggered screening machine in U.S. Pat. No. 6,431,366 include multiple screening units on a single screening machine. Slurry may be divided amongst each of the multiple screening units for increased efficiency.

Generally, flow dividers are employed to divide the flow of the slurry into multiple flows and/or screening locations. Flow dividers are usually circular tanks wherein the liquid or slurry is introduced tangentially in the upper portion of the tank and undergoes a cyclonic mixing as it descends along the circular wall of the tank. Usually, multiple discharge passages are disposed in common horizontal plane near the bottom of the tank or at least below the tangential inlet passage. Circular flow dividers may further include an annular flange or ledge to increase mixing of the slurry prior to discharge through one of the discharge passages.

Circular flow dividers are generally connected to screening units via hoses. The hoses may be connected to the flow dividers in a circular pattern at each of the discharge passages of the divider. Because the discharge passages are arranged in a circular pattern, either from a bottom surface or horizontal side surface of the flow divider, the discharge passages cannot line up directly above feed boxes of each of the screening units. Instead, hoses are typically curved and/or bent to create a connection to the feed boxes of the screen units. As a result, the hoses are usually different lengths and include bends and/or curvatures to create connections between the discharge passages and the feed boxes.

The circular pattern of the discharge passages, varying hose lengths and constricting bends and curves may lead to siphoning, and circular dividers often exhibit unequal slurry flow distribution. Moreover, because the discharge passages are connected via hoses that bend and curve to provide a flow path to the feed boxes, circular flow dividers typically require substantial installation heights above screening machines to ensure the hoses are not overly curved or bent. Typically, circular flow dividers must be located on a structure that is a floor or more above the screening machine to provide optimal flow characteristics.

Accordingly, there is need for new flow dividers and methods of dividing slurry that eliminate the problems associated with current systems, including eliminating uneven slurry distribution between screening surfaces, eliminating the large space requirements associated with locating a flow divider at substantial heights above a screening unit and eliminating the need for lengthy and/or multiple curved and/or bent hose connections between a flow divider and a screening unit.

SUMMARY

According to an exemplary embodiment of the present invention a flow divider is provided that includes a slurry receiving compartment and a discharge arrangement having a plurality of discharge apertures. The slurry receiving compartment is arranged to relatively uniformly flow a portion of a slurry into each of the discharge apertures and the discharge arrangement is arranged such that each portion of the slurry exits each of the discharge apertures at a relatively even flow rate. The discharge apertures may be arranged linearly and/or horizontally such that the portions of the slurry exits each of the discharge apertures at a relatively even flow rate and feed feed boxes connected to a screening surface or screening surfaces of a screening machine.

According to an exemplary embodiment of the present invention a system is provided that includes a flow divider, feeder boxes and a screening machine. The flow divider has a slurry receiving compartment and a discharge arrangement including a plurality of discharge apertures arranged in a substantially linear configuration. The screening machine has a plurality of screening units with screening surfaces. The feeder boxes are configured to feed a slurry onto an associated screening surface. The slurry receiving compartment is configured to fill with slurry such that the slurry flows substantially evenly into each of the plurality of discharge apertures. The discharge arrangement is configured such that each discharge aperture allows a portion of the slurry to flow substantially uniformly into each feeder box.

DETAILED DESCRIPTION

Figure 1:
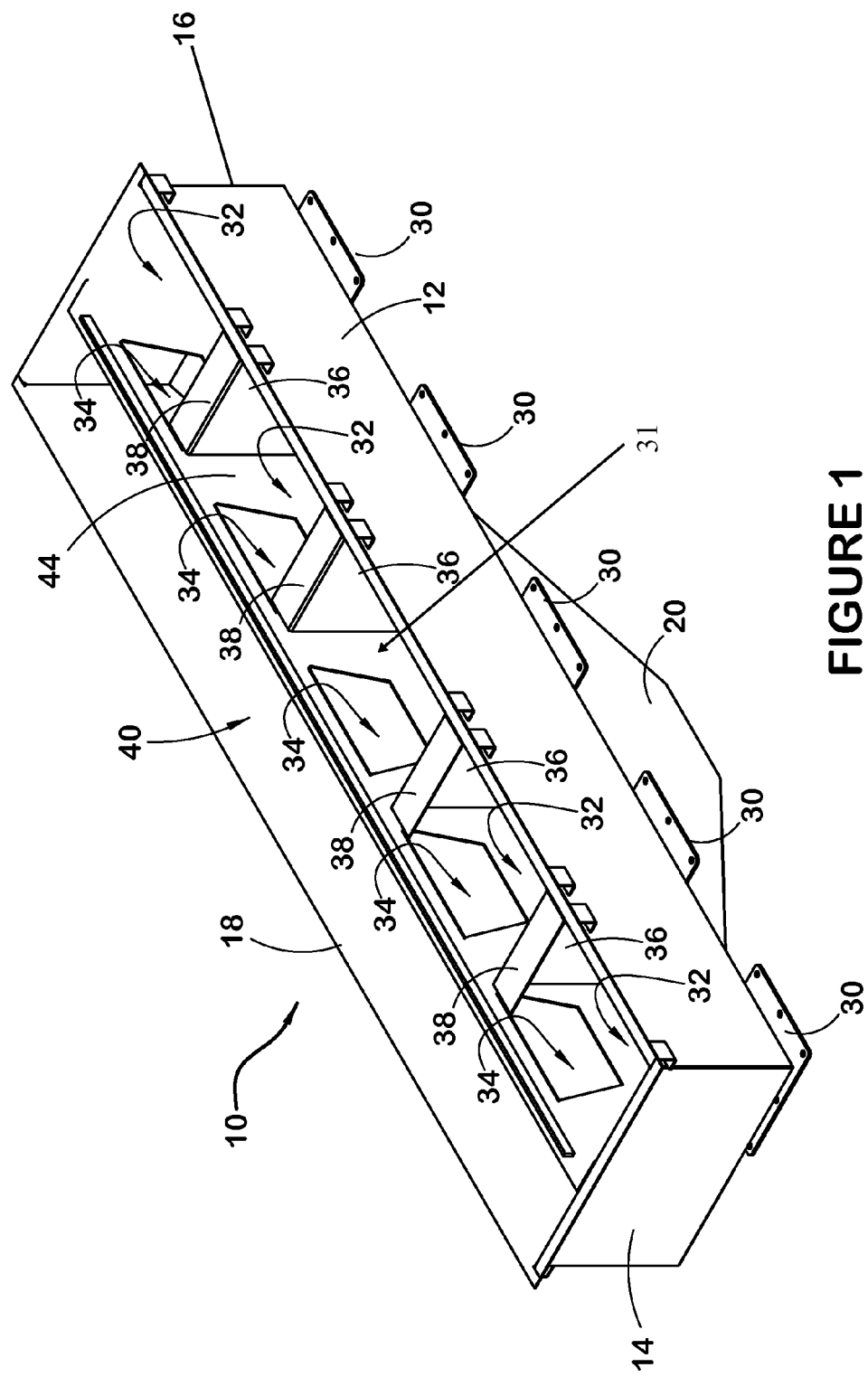
FIG. 1 is a top front isometric view of a flow divider with no covers, according to an example embodiment of the present invention.

Like reference characters denote like parts in the drawings.

In example embodiments, an improved flow divider is provided having a plurality of discharge apertures that may be vertically aligned with a plurality of feed boxes of a vibratory screening machine having a plurality of screening units. The flow divider may receive an inlet slurry flow via a slurry pump. In alternative embodiments, the flow divider may receive slurry from a gravity feed. The flow divider may have an arrangement of discharge apertures which may be incorporated into a discharge compartment. The discharge compartment may be separated into a plurality of discharge sub-compartments. There may be two or more discharge apertures. The number of discharge apertures may correspond with the number of screening units of a screening machine. The flow divider may be configured to substantially evenly divide flow amongst the plurality of discharge apertures, which may provide substantially even flow of separate portions of slurry to a feed boxes; each feed box associated with a screening unit. Embodiments may be configured for installation on a screening machine having a plurality of vertically tiered screening units or for providing separate flows to one or more screening units. Embodiments include methods of improving slurry flow division amongst multiple screening units which may be part of a single screening machine.

Figure 3:
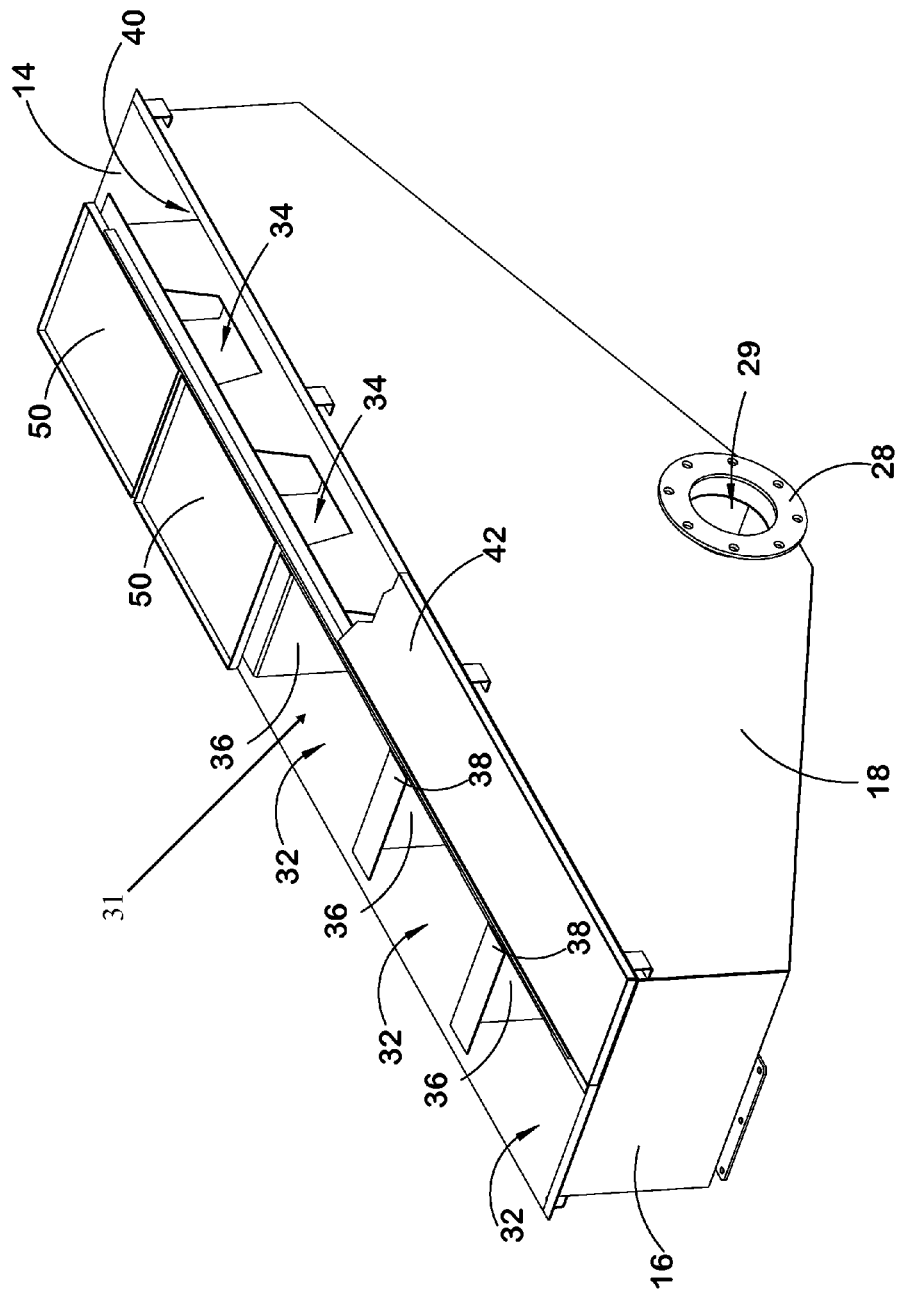
FIG. 3 is a top rear isometric view of a flow divider with partial covers, according to an example embodiment of the present invention.

FIG. 1 is a top front isometric view of an exemplary embodiment of the present disclosure. In the example embodiment, flow divider 10 has an upper front member 12, which is substantially rectangular, a first side member 14 attached to upper front member 12, and second side member 16 attached to upper front member 12. First side member 14 and second side member 16 are also connected to rear member 18. See, e.g., FIG. 3. Both first side member 14 and second side member 16 may be substantially rectangular and may be substantially parallel to each other. Upper front member 12 and rear member 18 may be substantially parallel and may be substantially perpendicular to first side member 14 and second side member 16.

Figure 2:
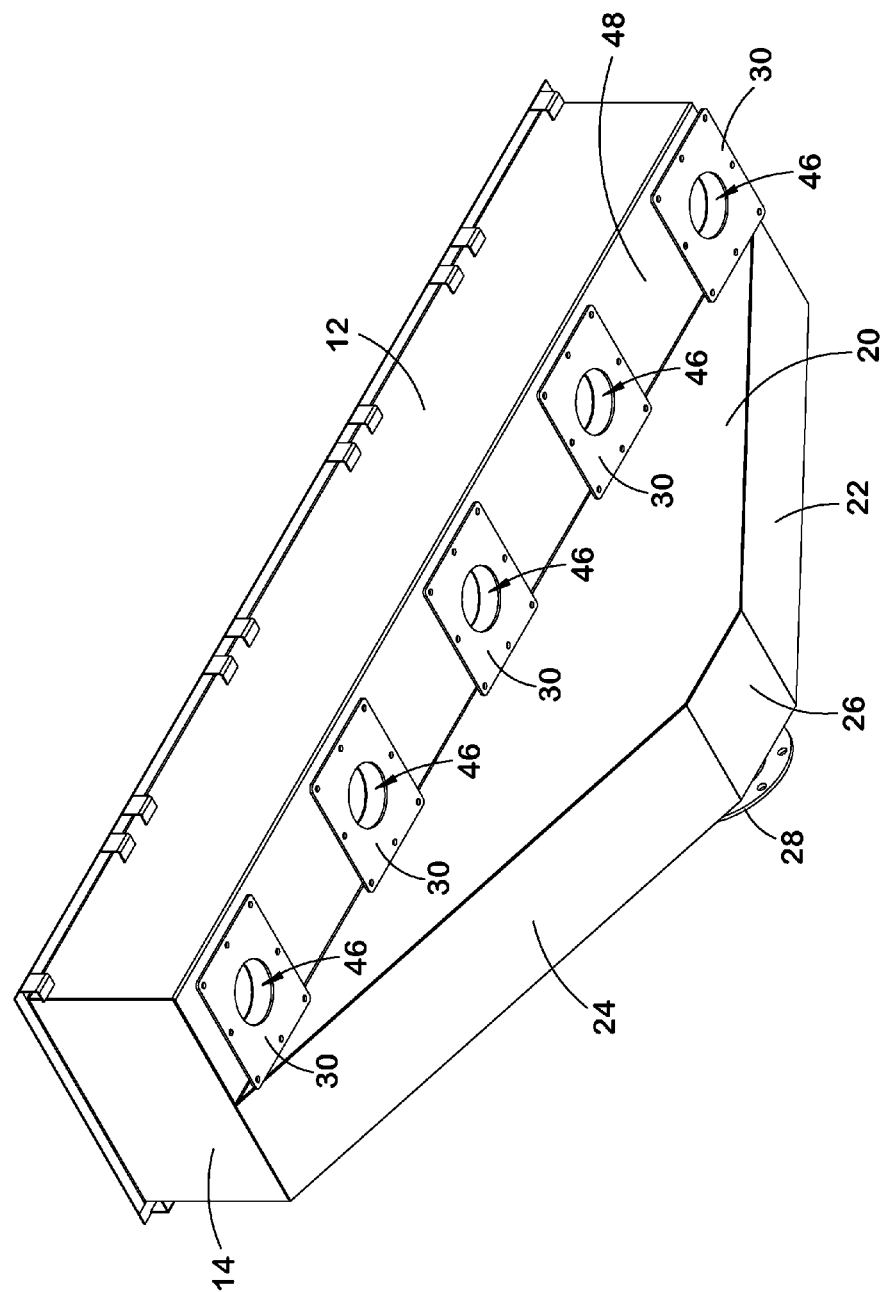
FIG. 2 is a bottom front isometric view of the flow divider shown in FIG. 1.

Rear member 18 has an upper portion connected to first side member 14 and second side member 16 and a lower portion connected to first angled bottom member 22, second angled bottom member 24, and flat bottom member 26. See, e.g., FIG. 2. First angled bottom member 22, second angled bottom member 24, and flat bottom member 26 also connect to lower front member 20.

As shown in FIG. 1, flow plate 44 may connect to first side member 14 and second side member 16 and may be an extension of lower front member 20. Flow plate 44 is substantially parallel to upper front member 12 and rear member 18. Discharge plate 48 is attached to flow plate 44, first side member 14, second side member 16, and upper front member 12 and forms a bottom surface of discharge compartment 31. See, e.g., FIG. 2. Discharge compartment 31 is a slurry receiving and discharge space formed by flow plate 44, upper front member 12, a portion of first side member 14, a portion of second side member 16, and discharge plate 48. As shown in FIG. 1, discharge compartment 31 may be divided into a plurality of discharge sub-compartments 32 via a plurality of separator plates 36. Separator plates 36 are substantially parallel and attached to upper front member 12, flow plate 44, and discharge plate 48 and are configured such that a plurality of discharge sub-compartments 32 are formed. The plurality of separator plates 36 may include flanges 38 which may provide stability to separator plates 36. The plurality of separator plates 36 may be located such that each of the plurality of discharge sub-compartments 32 is substantially equal in size.

Embodiments of the present invention also provide a flow divider that includes a flow plate without feed pockets. The flow plate may be configured to act as a weir such that the slurry evenly flows over the weir and into separate discharge apertures.

Figure 1A:
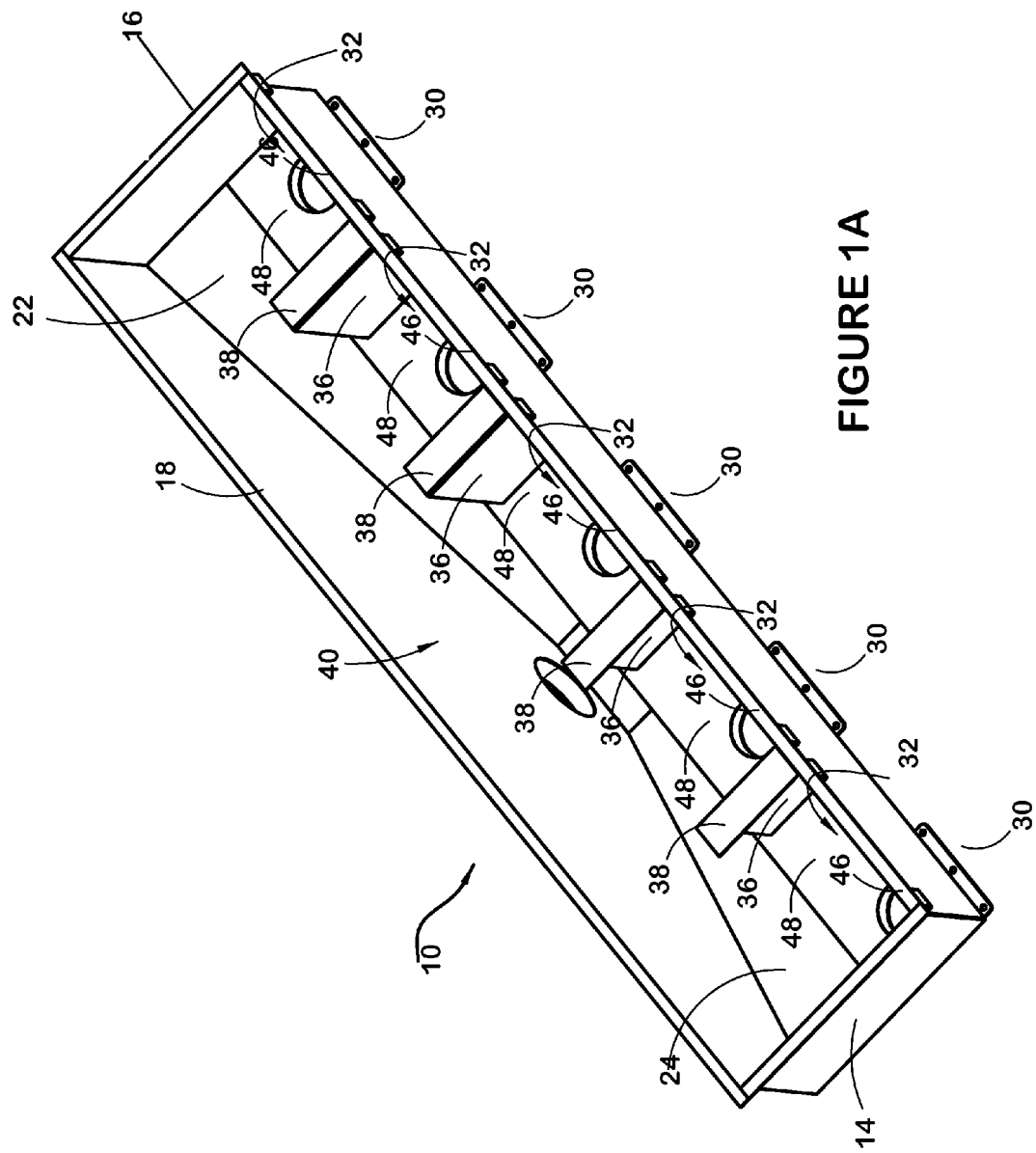
FIG. 1A is a top front isometric view of a flow divider with no covers and no flow plate, according to an example embodiment of the present invention.

As shown in FIG. 1A, flow divider 10 may not include a flow plate and the slurry may flow from the slurry receiving compartment 40 to a discharge arrangement having discharge apertures 46 without having a separate discharge compartment 31. Separator plates 36 may also be eliminated from the example embodiment shown in FIG. 1A such that there are no longer plurality of separate discharge sub-compartments 32.

A plurality of outlet connectors 30 are attached to discharge plate 48 and are configured such that one outlet connector 30 is on a bottom surface of each of the plurality of discharge compartments 32. Connector plates 30 may be attached to hoses and/or tubes configured to transmit slurry from the plurality of discharge compartments 32 to a plurality of feeder boxes of a screening machine. Connector plates 30 have flow apertures 46 through which slurry may pass.

The plurality of discharge sub-compartments 32 may include removable covers 50. See, e.g., FIG. 3. The plurality of discharge sub-compartments 32 may be filled via a plurality of feed pockets 34 in flow plate 44. See, e.g., FIG. 1. Feed pockets 34 are apertures joining the plurality of discharge compartments 32 with slurry receiving compartment 40. Each of the plurality of feed pockets 34 forms a weir such that the slurry relatively simultaneously flows over each weir into each discharge sub-compartment 32. Slurry receiving compartment 40 is formed by at least rear member 18, lower front member 20, first angled bottom member 22, second angled bottom member 24, flat bottom member 26, a portion of first side member 14, a portion of second side member 16, and flow plate 44. See, e.g., FIGS. 1 to 3.

Slurry may be fed into slurry receiving compartment 40 and allowed to accumulate. As slurry continues to accumulate, a top level of the slurry rises to a level where it is equal to a lower portion of feed pockets 34. Feed pockets 34 are configured such that each is substantially the same size and located substantially the same distance above a line parallel with flat bottom member 26 such that a rising slurry level will reach each of the plurality of feed pockets 34 at substantially the same time. As additional slurry is added to slurry receiving compartment 40, the slurry level rises above feed pockets 34 and a relatively uniform flow of slurry may pass through each of the feed pockets 34 and into the plurality of discharge sub-compartments 32. As the slurry fills the plurality of discharge sub-compartments 32, it passes through discharge apertures 46 at a relatively even flow rate and may be transferred to feeder boxes of a screening machine. The plurality of discharge compartments 32 and discharge apertures 46 may be arranged such that each discharge aperture 46 is substantially directly above a feeder box when flow divider 10 is installed on a screening machine.

Slurry may be pumped into slurry receiving compartment 40 or it may be added via gravity flow. Slurry may be added at a top opening of slurry receiving compartment 40. Alternatively, slurry receiving compartment 40 may include cover 42. See, e.g., FIG. 3. In certain embodiments, rear member 18 may include inlet connector 28 which may be near a bottom portion of member 18. Inlet connector 28 may be connected to a pump or other tubing configured to pump slurry into slurry receiving compartment 40 via inlet aperture 29. Inlet aperture 29 may be capped if slurry is added via the top opening of slurry receiving compartment 40.

Embodiments of the present invention eliminate lengthy and/or significantly curved and/or bent transmission lines from flow divider to screening machine. By aligning divided flows of slurry with feeder boxes of a screening machine, transmission from divider to screening machine may be substantially linear. By eliminating curvatures and/or bent transmission lines, siphoning effects and/or unequal flow distributions may be substantially reduced. This ensures increased efficiency when utilizing a screening machine having multiple screening units. Moreover, the alignment of slurry flow with feeder boxes allows embodiments of present invention to be installed much closer to a screening machine than typical flow dividers. This may reduce space requirements and infrastructure costs.

Figure 4:
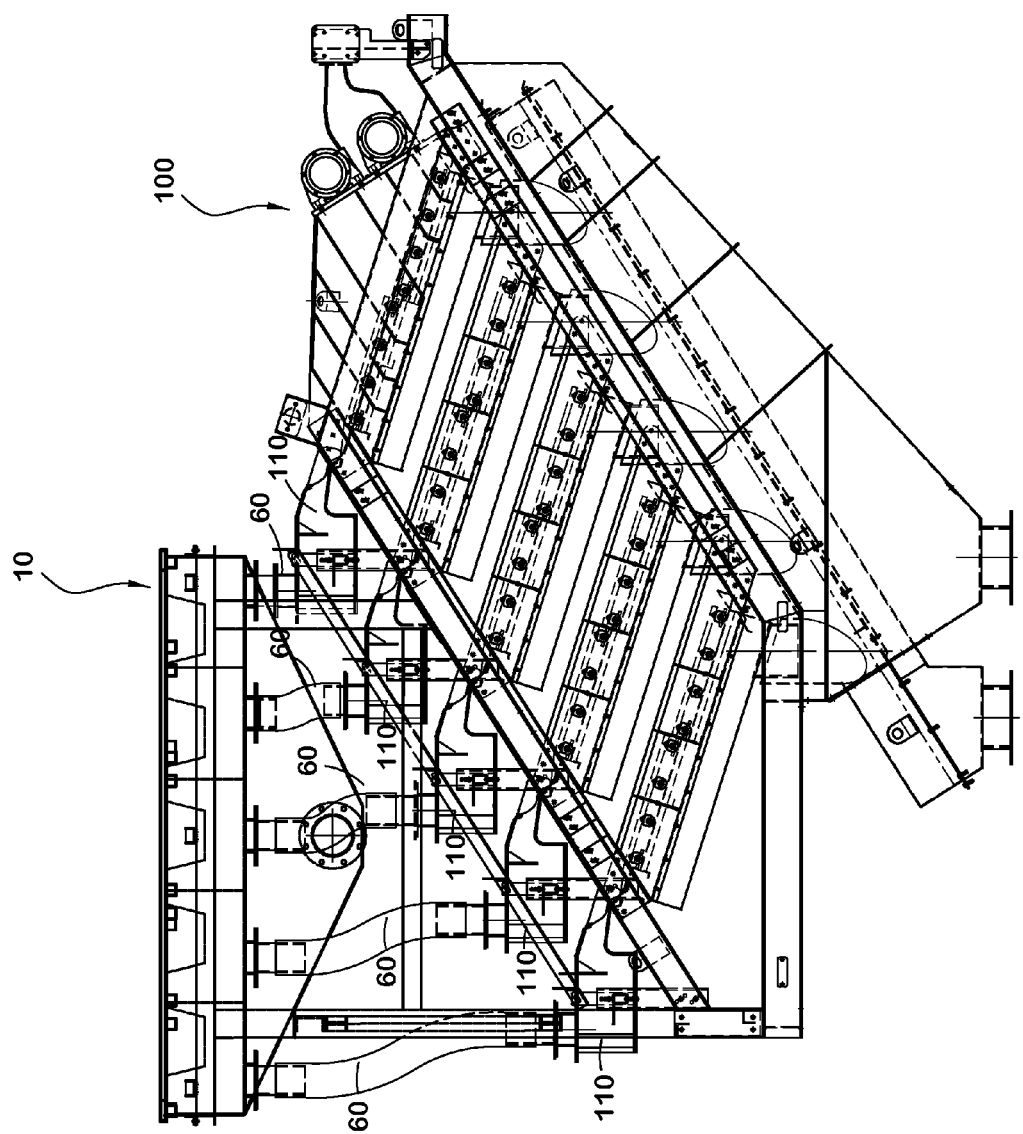
FIG. 4 is a side view of a flow divider connected to a screening machine having multiple screening units, according to an example embodiment of the present invention.
Figure 5:
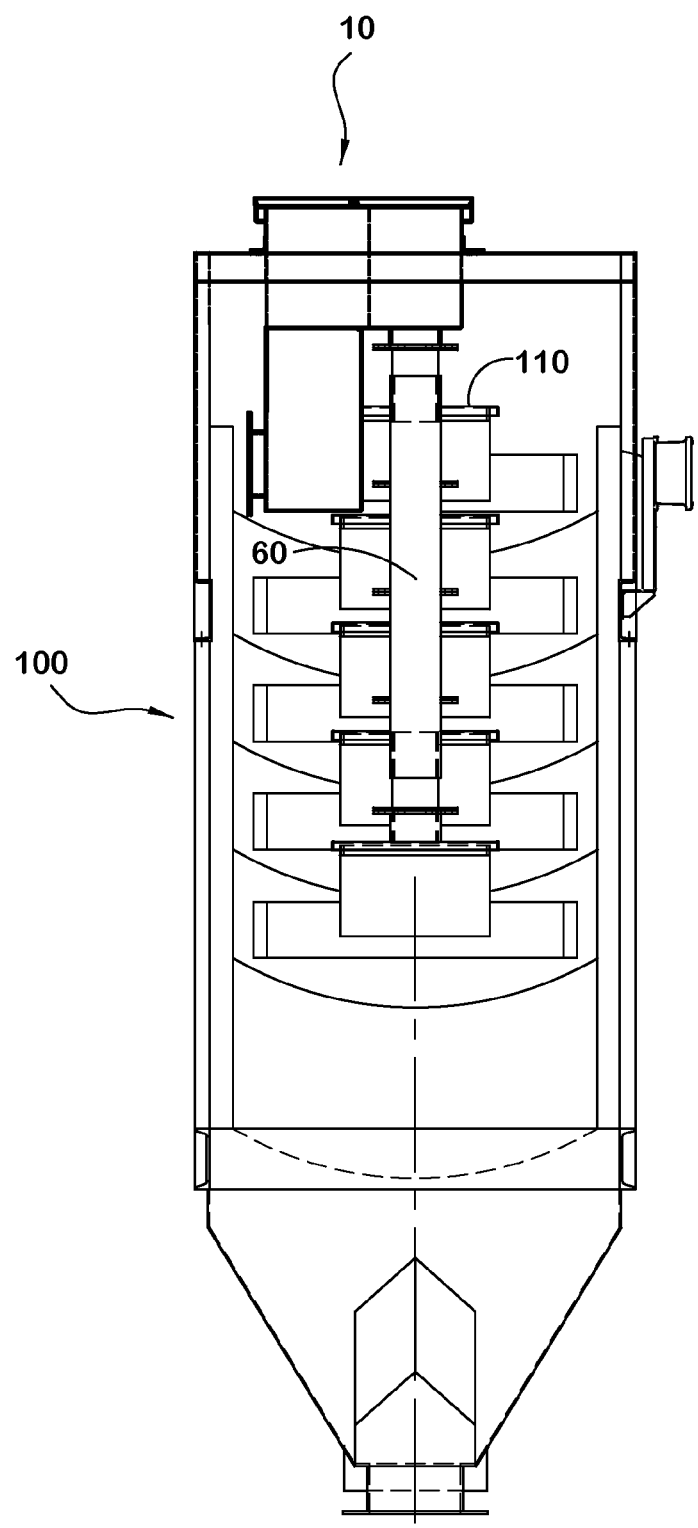
FIG. 5 is a front view of a flow divider connected to a screening machine having multiple screening units, according to an example embodiment of the present invention.

In the example embodiments shown in FIGS. 4 and 5, flow divider 10 is connected to screening machine 100 having five screening units stacked into a single machine. As shown, each of five discharge compartments is connected to feeder boxes 110 of the screening machine 100. The discharge compartments are substantially vertically aligned with feeder boxes 110 and connected via tubes 60. Tubes 60 may incorporate or include vent pipes and/or venting to equalize pressures wherein longer tubes may have pressures and/or siphoning effects if pressure is not equalized. There is little to no curvature or bending in the flows between flow divider 10 and screening machine 100. Moreover, flow divider 10 is installed only a relatively small distance above screening machine 100, substantially reducing height requirements and support structure costs over traditional flow dividers.

The embodiments shown in the Figures and described herein include five discharge compartments and are configured for attachment to a screening machine with five screening units. However, multiple alternative embodiments may be employed with the present invention and may be configured for attachment to a variety of screening machines. For example, the present disclosure may be configured to attach to each of the embodiments of the screening machine described in U.S. Pat. No. 6,820,748 which patent and embodiments therein are incorporated herein by reference. Embodiments of the present invention may have two or more discharge compartments.

In exemplary embodiments of the present inventions, methods of dividing a slurry flow are provided that include the embodiments of the flow divider and screening units as described. The methods include pouring or pumping the slurry into a slurry receiving compartment connected to a plurality of discharge compartments via a plurality of feed pockets. Slurry may be accumulated in the slurry receiving compartment causing a top level of the slurry to rise. As the top level of the slurry rises, it reaches the feed pockets and pours into the plurality of discharge compartments. The slurry may then be passed through a plurality of discharge apertures at a bottom of each of the plurality of discharge compartments and transmitted to feeder boxes of a screening machine.

While the embodiments are described with reference to various implementations and exploitations, it will be understood that these embodiments are illustrative and that the scope of the inventions is not limited to them. Many variations, modifications, additions, and improvements are possible. Further still, any steps described herein may be carried out in any desired order, and any desired steps may be added or deleted. Support for the present invention may be found in the attached documents and figures, all of which are expressly incorporated herein in their entirety by reference thereto.

What is claimed is:

1. A system, comprising:
    a flow divider having a slurry receiving compartment and a discharge arrangement including a plurality of discharge apertures arranged in a substantially linear configuration; and
    a screening machine having a plurality of screening units with screening surfaces; and
    a plurality of feeder boxes, each feeder box configured to feed a slurry onto an associated screening surface,
    wherein the slurry receiving compartment is configured to fill with slurry such that the slurry flows substantially evenly into each of the plurality of discharge apertures,
    wherein the discharge arrangement is configured such that each discharge aperture allows a portion of the slurry to flow substantially uniformly into each feeder box.

2. The system of claim 1, wherein the screening units are arranged vertically above each other and form a multi-tiered vibratory screening machine, the discharge apertures connected to the feeder boxes via a conduit and the flow divider is at least one of structurally connected to the vibratory screening machine, located next to the vibratory screening machine and at an elevation slightly above the vibratory screening machine such that the slurry flows substantially directly from each discharge aperture to each feeder box.

3. The system of claim 1, wherein the discharge apertures are arranged in a substantially horizontal configuration.

4. The system of claim 1, wherein each discharge aperture is substantially directly above each feeder box.

5. The system of claim 1, wherein the discharge arrangement is configured as a discharge compartment, the discharge compartment separated from the receiving compartment by a flow plate having a plurality of feed pockets, each feed pocket relatively evenly directing a portion of the slurry to a discharge aperture.

6. The system of claim 5, wherein the flow divider includes: an upper front member; first and second side members substantially perpendicular to and attached at opposite ends of the upper front member; a rear member having an upper portion attached to the first and second side members opposite the attachment of the upper front member; a lower portion of the rear member attached to a first angled bottom member, a second angled bottom member, and a flat bottom member; a lower front member attached to the first angled bottom member, the second angled bottom member, and the flat bottom member; the flow plate attached to the first and second side members at a position between the upper front member and the upper rear member and substantially parallel to the upper front member and the upper rear member; a discharge plate attached to the flow plate, a bottom portion of the first side member, a bottom portion of the second side member, and a bottom portion of the upper front member; wherein the discharge plate, a first portion of the first side member, a first portion the second side member, the flow plate and the upper front member form the discharge compartment; wherein the rear member, the lower front member, the first angled bottom member, the second angled bottom member, the flat bottom member, a second portion of the first side member, a second portion of the second side member, and the flow plate form the slurry receiving compartment; wherein the discharge plate includes the plurality of discharge apertures.

7. The system of claim 1, wherein slurry is at least one of pumped into the slurry receiving compartment and gravity fed into the slurry receiving compartment.

8. The system of claim 5, further comprising a plurality of separator plates that divide the discharge compartment into a plurality of discharge sub-compartments, each sub-compartment including a feed pocket and a discharge aperture.

9. The system of claim 8, wherein each of the plurality of separator plates includes a vertical plate having a substantially horizontal flange extending from a top portion of the vertical plate.

10. The system of claim 8, wherein the flow divider is configured such that a bottom portion of each feed pocket forms a weir such that the slurry relatively simultaneously flows over the weirs into each sub-compartment.

11. The system of claim 8, further comprising a plurality of removable covers configured to cover the plurality of discharge sub-compartments.

12. The system of claim 6, wherein the flow plate is an extension of the lower front member.

13. A flow divider, comprising:
a slurry receiving compartment; and
a discharge arrangement having a plurality of discharge apertures,
wherein the slurry receiving compartment is arranged to relatively uniformly flow a portion of a slurry into each of the discharge apertures and the discharge arrangement is arranged such that each portion of the slurry exits each of the discharge apertures at a relatively even flow rate,
wherein the discharge arrangement is configured as a discharge compartment, the discharge compartment separated from the receiving compartment by a flow plate have a plurality of feed pockets, each feed pocket relatively evenly directing the portions of the slurry to each of the discharge apertures,
wherein the flow divider further comprises a plurality of separator plates that divide the discharge compartment into a plurality of discharge sub-compartments, each sub-compartment including a feed pocket and a discharge aperture.

14. The flow divider of claim 13, wherein the discharge apertures are arranged at least one of linearly, planar and horizontally.

15. The flow divider of claim 13, wherein the flow divider includes: an upper front member; first and second side members substantially perpendicular to and attached at opposite ends of the upper front member; a rear member having an upper portion attached to the first and second side members opposite the attachment of the upper front member; a lower portion of the rear member attached to a first angled bottom member, a second angled bottom member, and a flat bottom member; a lower front member attached to the first angled bottom member, the second angled bottom member, and the flat bottom member; the flow plate attached to the first and second side members at a position between the upper front member and the upper rear member and substantially parallel to the upper front member and the upper rear member; a discharge plate attached to the flow plate, a bottom portion of the first side member, a bottom portion of the second side member, and a bottom portion of the upper front member; wherein the discharge plate, a first portion of the first side member, a first portion the second side member, the flow plate and the upper front member form the discharge compartment; wherein the rear member, the lower front member, the first angled bottom member, the second angled bottom member, the flat bottom member, a second portion of the first side member, a second portion of the second side member, and the flow plate form the slurry receiving compartment; wherein the discharge plate includes the plurality of discharge apertures.

16. The flow divider of claim 13, wherein slurry is at least one of pumped into the slurry receiving compartment and gravity fed into the slurry receiving compartment.

17. The flow divider of claim 13, wherein each of the plurality of separator plates includes a vertical plate having a substantially horizontal flange extending from a top portion of the vertical plate.

18. The flow divider of claim 13, wherein the flow divider is configured such that a bottom portion of each feed pocket forms a weir such that the slurry relatively simultaneously flows over the weirs into each sub-compartment.

19. The flow divider of claim 13, further comprising a plurality of removable covers configured to cover the plurality of discharge sub-compartments.

20. The flow divider of claim 15, wherein the flow plate is an extension of the lower front member.

21. The flow divider of claim 13, further comprising a plurality of conduits attached to the discharge apertures such that the slurry is transmitted to a plurality of feeder boxes, each discharge aperture relatively evenly flowing a portion of the slurry to each feeder box and each feeder box arranged to transmit the portion of the slurry to a screening surface of a multi-tiered screening machine.

22. The flow divider of claim 21, wherein the screening machine includes screening units that are arranged vertically above each other and the flow divider is at least one of structurally connected to the vibratory screening machine, located next to the vibratory screening machine and at an elevation slightly above the vibratory screening machine such that the slurry flows substantially directly from each discharge aperture to each feeder box.

23. The flow divider of claim 21, wherein the discharge apertures are arranged at least one of linearly, planar and horizontally.

24. The flow divider of claim 21, wherein each discharge aperture is substantially directly above each feeder box.

25. The flow divider of claim 21, wherein each discharge aperture is aligned with each of the plurality of feed boxes such that the conduit is substantially free of curvatures.

26. A method, comprising the steps of:
receiving a slurry into a flow divider having a slurry receiving compartment and a discharge arrangement having a plurality of discharge apertures;
flowing the slurry substantially uniformly from the receiving compartment to the individual discharge apertures; and
discharging a portion of the slurry substantially evenly from each of the individual discharge apertures,
wherein the discharge arrangement is configured as a discharge compartment, the discharge compartment separated from the receiving compartment by a flow plate having a plurality of feed pockets, each feed pocket directing a portion of the slurry to a discharge aperture.

27. The method of claim 26, further comprising the steps of:
flowing the portion of the slurry to a feed box; and
flowing the portion of the slurry from the feed box to a screening surface of a screening machine, the screening machine having multiple tiered screening surfaces.

28. The method of claim 26, wherein the discharge apertures are arranged at least one of linearly, planar and horizontally.

29. The method of claim 27, wherein the screening surfaces are arranged vertically above each other, the discharge apertures are connected to the feeder boxes via a conduit and the flow divider is at least one of structurally connected to the vibratory screening machine, located next to the vibratory screening machine and at an elevation slightly above the vibratory screening machine such that the slurry flows substantially directly from each discharge aperture to each feeder box.

30. The method of claim 27, wherein the discharge apertures are arranged in a substantially horizontal configuration.

31. The method of claim 27, wherein each discharge aperture is substantially directly above each feeder box.

\* \* \* \* \*